United States Patent
Negro et al.

(10) Patent No.: US 10,869,332 B2
(45) Date of Patent: Dec. 15, 2020

(54) TRANSMISSION SCHEME FOR MULTIPLE COMPONENT CARRIERS IN ADJACENT SUBFRAMES

(71) Applicant: QUALCOMM Incorporated, San Diego, CA (US)

(72) Inventors: Francesco Negro, Nuremberg (DE); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/648,229

(22) Filed: Jul. 12, 2017

(65) Prior Publication Data
US 2019/0021107 A1    Jan. 17, 2019

(51) Int. Cl.
| | |
|---|---|
| H04W 72/14 | (2009.01) |
| H04W 72/12 | (2009.01) |
| H04L 5/00 | (2006.01) |
| H04L 27/26 | (2006.01) |
| H04W 74/08 | (2009.01) |
| H04L 1/00 | (2006.01) |

(52) U.S. Cl.
CPC ............ *H04W 72/14* (2013.01); *H04L 5/001* (2013.01); *H04L 27/2602* (2013.01); *H04W 72/1289* (2013.01); *H04L 1/00* (2013.01); *H04W 74/0808* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 2004/0151109 | A1* | 8/2004 | Batra | H04L 1/0071 370/208 |
| 2013/0059614 | A1* | 3/2013 | Kannan | H04W 72/06 455/500 |
| 2013/0229996 | A1* | 9/2013 | Wang | H04L 1/1685 370/329 |
| 2015/0131536 | A1* | 5/2015 | Kaur | H04W 72/0453 370/329 |
| 2016/0095134 | A1* | 3/2016 | Chen | H04L 1/1861 370/336 |
| 2016/0286404 | A1 | 9/2016 | Rico et al. | |

(Continued)

FOREIGN PATENT DOCUMENTS

| | | |
|---|---|---|
| WO | WO2016048227 A2 | 3/2016 |
| WO | WO2016081375 A1 | 5/2016 |

(Continued)

Primary Examiner — Nicholas Sloms
(74) Attorney, Agent, or Firm — Holland & Hart LLP

(57) ABSTRACT

Methods, systems, and devices for wireless communication are described. A user equipment (UE) may receive a first grant to perform a first uplink transmission in a first subframe using a first component carrier. The UE may receive a second grant to perform a second uplink transmission in a second subframe adjacent the first subframe in time. The UE may determine to null one or more symbols of the uplink transmission in the first subframe based at least in part on the second grant. In some cases, the UE may determine to null the one or more symbols of the first uplink transmission is based at least in part on an availability of a single radio frequency (RF) frontend for use by the UE.

27 Claims, 11 Drawing Sheets

(56) References Cited

U.S. PATENT DOCUMENTS

| | | | |
|---|---|---|---|
| 2017/0163388 A1* | 6/2017 | Wiemann | H04L 1/1861 |
| 2017/0164169 A1* | 6/2017 | Agiwal | H04W 4/023 |
| 2017/0359808 A1* | 12/2017 | Dinan | H04W 72/042 |
| 2018/0007731 A1* | 1/2018 | Park | H04W 24/08 |
| 2018/0098223 A1* | 4/2018 | Hugl | H04L 5/0044 |
| 2018/0323946 A1* | 11/2018 | Bendlin | H04L 5/0098 |
| 2019/0200379 A1* | 6/2019 | Wang | H04W 74/0808 |

FOREIGN PATENT DOCUMENTS

| | | |
|---|---|---|
| WO | WO2016163973 A1 | 10/2016 |
| WO | WO2017030603 A1 | 2/2017 |

* cited by examiner

TRANSMISSION SCHEME FOR MULTIPLE COMPONENT CARRIERS IN ADJACENT SUBFRAMES

BACKGROUND

The following relates generally to wireless communication, and more specifically to transmission scheme for multiple component carriers (CCs) in adjacent subframes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

License-Assisted Access (LAA) wireless communications systems may support carrier aggregation (CA) across licensed and unlicensed spectrum bands. For example, a CC in the licensed spectrum band may be allocated for control information and a CC in the unlicensed spectrum band may be allocated for data communications. In some wireless communications systems, a UE may receive a grant to transmit on a first component carrier during a first subframe and another grant to transmit on a second component carrier during a second subframe. When grants for multiple component carriers are received by a UE, some of the multiple CCs may be in different spectrum bands. In an unlicensed spectrum, the UE performs a listen-before-talk (LBT) procedure prior to beginning an uplink transmission. Transmission over each subframe is performed using available radio frequency (RF) frontends. Therefore, when a UE receives grants for adjacent subframes, and the UE has a single RF frontend available, an LBT procedure for a subframe cannot be successfully performed in a prior adjacent subframe. Therefore, it is desired to have efficient scheduling of multiple CC in adjacent subframes for UEs having a single RF frontend available.

SUMMARY

The described techniques relate to improved methods, systems, devices, and apparatuses that support a transmission scheme for multiple CCs in adjacent subframes. In some wireless communications systems, a UE may receive a first grant to transmit on a first CC during a first subframe and a second grant to transmit on a second CC during a second subframe. In unlicensed spectrum, UEs may employ LBT procedures to ensure that the channel is clear before transmitting data. For example, in order to detect whether the channel is free during the second subframe, the UE performs an LBT procedure during the first subframe. However, if the UE has a single RF frontend available for use, the LBT procedure for the second subframe cannot be performed during the first subframe as the UE uses the RF frontend is for transmission via the first CC during the first subframe.

When receiving grants for multiple CCs, the UE may determine whether uplink transmission is scheduled in adjacent subframes using different CCs. If two CCs are scheduled in adjacent subframes, the UE may determine to null one or more symbols of the uplink transmission in the first subframe. For example, upon receiving the first grant and the second grant, the UE may determine to null one or more symbols during the first subframe in order to perform an LBT procedure for the second transmission (e.g., during the nulled symbols). In some cases, nulling the symbols may depend on whether the UE has a single RF frontend available. For example, if the UE has a single RF available for use, the UE may determine that the uplink transmission in a given subframe should be nulled in order to be able to perform a successful LBT and uplink transmission in the adjacent subframe.

A method of wireless communication is described. The method may include receiving, at a UE, a first grant to perform a first uplink transmission in a first subframe using a first component carrier CC, receiving, at the UE, a second grant to perform a second uplink transmission in a second subframe adjacent the first subframe in time, and determining to null one or more symbols of the uplink transmission in the first subframe based at least in part on the second grant.

An apparatus for wireless communication is described. The apparatus may include means for receiving, at a UE, a first grant to perform a first uplink transmission in a first subframe using a first CC, means for receiving, at the UE, a second grant to perform a second uplink transmission in a second subframe adjacent the first subframe in time, and means for determining to null one or more symbols of the uplink transmission in the first subframe based at least in part on the second grant.

Another apparatus for wireless communication is described. The apparatus may include a processor, memory in electronic communication with the processor, and instructions stored in the memory. The instructions may be operable to cause the processor to receive, at a UE, a first grant to perform a first uplink transmission in a first subframe using a first CC, receive, at the UE, a second grant to perform a second uplink transmission in a second subframe adjacent the first subframe in time, and determine to null one or more symbols of the uplink transmission in the first subframe based at least in part on the second grant.

A non-transitory computer-readable medium for wireless communication is described. The non-transitory computer-readable medium may include instructions operable to cause a processor to receive, at a UE, a first grant to perform a first uplink transmission in a first subframe using a first CC, receive, at the UE, a second grant to perform a second uplink transmission in a second subframe adjacent the first subframe in time, and determine to null one or more symbols of the uplink transmission in the first subframe based at least in part on the second grant.

Some examples of the method, apparatus, and non-transitory computer-readable medium described above may further include processes, features, means, or instructions for determining to null the one or more symbols of the first uplink transmission may be based at least in part on an availability of a single RF frontend for use by the UE.

In some examples of the method, apparatus, and non-transitory computer-readable medium described above, the second grant indicates a second CC to be used for the second uplink transmission, the second CC being different from the first CC.

Some examples of the method, apparatus, and non-transitory computer-readable medium described above may further include processes, features, means, or instructions for identifying a modulation and coding scheme (MCS) of the first uplink transmission in the first subframe. Some examples of the method, apparatus, and non-transitory computer-readable medium described above may further include processes, features, means, or instructions for determining a number of symbols to null based at least in part on the MCS of the first uplink transmission.

Some examples of the method, apparatus, and non-transitory computer-readable medium described above may further include processes, features, means, or instructions for determining a first duration for an LBT procedure of a second CC during the first subframe. Some examples of the method, apparatus, and non-transitory computer-readable medium described above may further include processes, features, means, or instructions for determining a second duration to switch from a first communication mode to a second communication mode during the first subframe. In some cases, the one or more symbols to null may be determined based at least in part on the first and second durations.

Some examples of the method, apparatus, and non-transitory computer-readable medium described above may further include processes, features, means, or instructions for performing, during the first duration and prior to a beginning of the second subframe, the LBT procedure of the second CC.

In some examples of the method, apparatus, and non-transitory computer-readable medium described above, the first communication mode comprises a transmission mode and the second communication mode comprises a reception mode. In some examples of the method, apparatus, and non-transitory computer-readable medium described above, the first grant may be an LAA grant for the first CC.

DETAILED DESCRIPTION

LAA wireless communications systems may support CA across licensed and unlicensed spectrum bands. For example, a CC in the licensed spectrum band may be allocated for control information and a CC in the unlicensed spectrum band may be allocated for data communications. In some wireless communications systems, a base station may transmit scheduling information (e.g., within a first grant) to a UE that indicates the UE may access a first CC during a first subframe (e.g., subframe n). In some cases, the scheduling information may include a second grant for transmission using a second CC during a second subframe (e.g., subframe n+1). The scheduling information for the first and second CCs second grant may be transmitted concurrently and in some examples, subframe n may be adjacent to subframe n+1. Alternatively, a single grant may indicate time (e.g., subframe) and frequency resources (e.g., CCs) for both the first and second CCs. When grants for multiple CCs are received by a UE, the UE performs an LBT procedure prior to beginning an uplink transmission using either CC.

Upon receiving the grant(s) for multiple CCs, the UE may determine whether uplink transmission is scheduled in adjacent subframes using different CCs. If two different CCs are scheduled in adjacent subframes, the UE may determine to null one or more symbols of the uplink transmission in a subframe (e.g., subframe n). This may free up time resources (e.g., the one or more symbols) to perform an LBT procedure and/or switch from downlink to uplink transmission prior to performing transmission in the following subframe (e.g., subframe n+1). In some cases, nulling the symbols may depend on whether the UE has a single RF frontend available. For instance, if the UE has a single RF available for use, the UE may determine that the uplink transmission in subframe n should be nulled in order to be able to perform an LBT procedure and uplink transmission for subframe n+1.

In some examples, the number of symbols nulled may be based on characteristics (e.g., MCS) of the uplink transmission in subframe n via the first CC. The UE may additionally or alternatively be capable of estimating the amount of time to perform the LBT procedure for subframe n+1 and may null one or more symbols of the uplink transmission during subframe n.

Aspects of the disclosure are initially described in the context of a wireless communications system that support a transmission scheme for multiple CCs in adjacent subframes. Aspects are then described with reference to transmission schemes and process flows. Aspects of the disclosure are further illustrated by and described with reference to apparatus diagrams, system diagrams, and flowcharts that relate to transmission scheme for multiple CCs in adjacent subframes.

Figure 1:
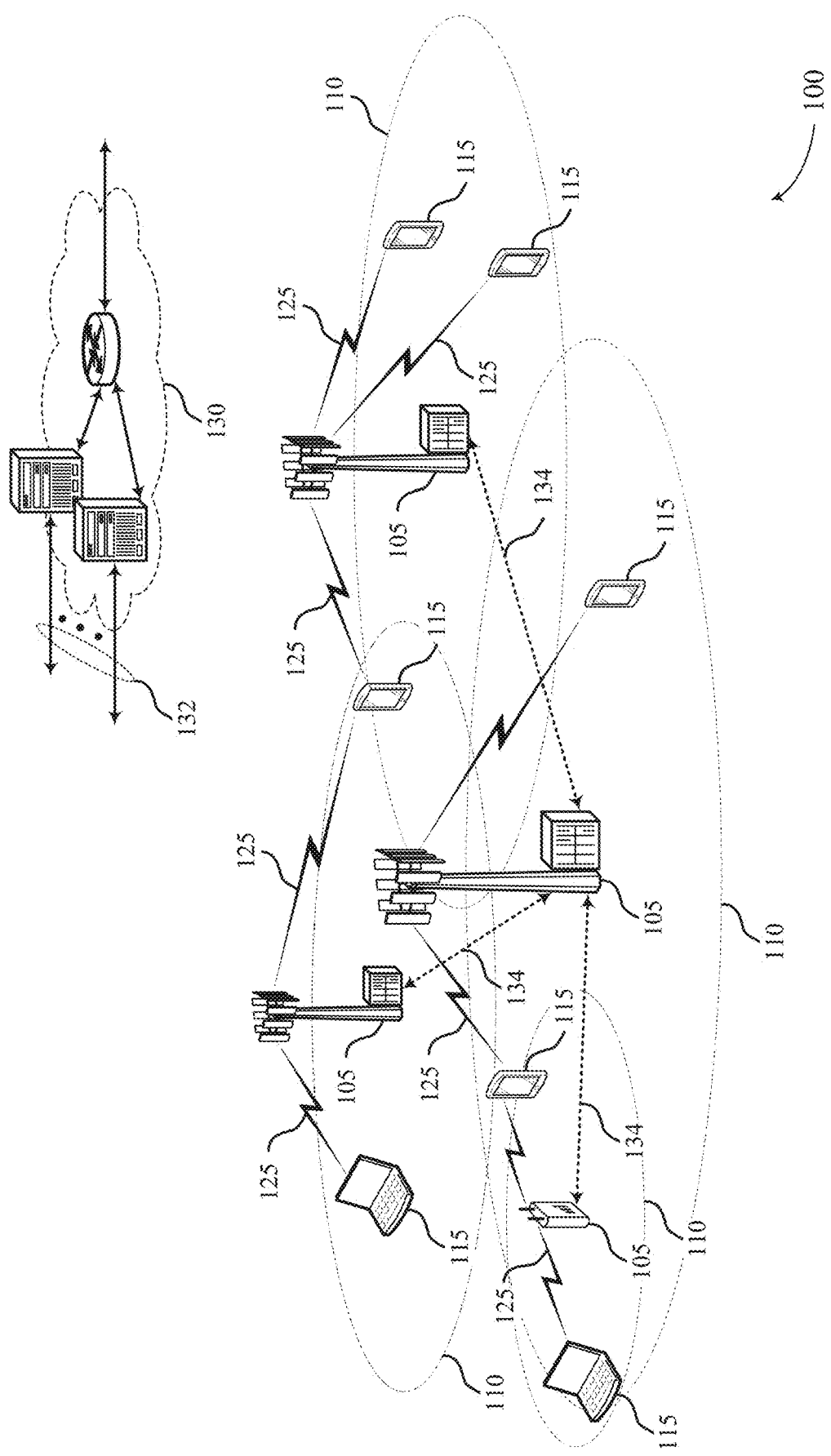
FIG. 1 illustrates an example of a system for wireless communication that supports transmission schemes for multiple CCs in adjacent subframes in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE, LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

A resource element may comprise of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as CA or multi-carrier operation. A carrier may also be referred to as a CC, a layer, a channel, etc. The terms "carrier," "CC," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) CCs.

In some cases, wireless communications system 100 may utilize enhanced CCs (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may comprise of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA), LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

According to techniques described herein, wireless communications system 100 may support a transmission scheme for multiple CCs in adjacent subframes for UEs 115. UE 115 may receive a first grant to perform a first uplink transmission in a first subframe using a first CC. UE 115 may receive second grant to perform a second uplink transmission in a second subframe using a second CC. The second grant may be received by UE 115 at a later time. The second subframe may be adjacent to the first subframe. Upon receiving the first grant and the second grant, UE 115 may determine if there is a single RF frontend available for use by UE 115. If UE 115 determines that there is a single RF frontend available for use, UE 115 may determine to null one or more symbols of the uplink transmission in the first subframe.

Figure 2:
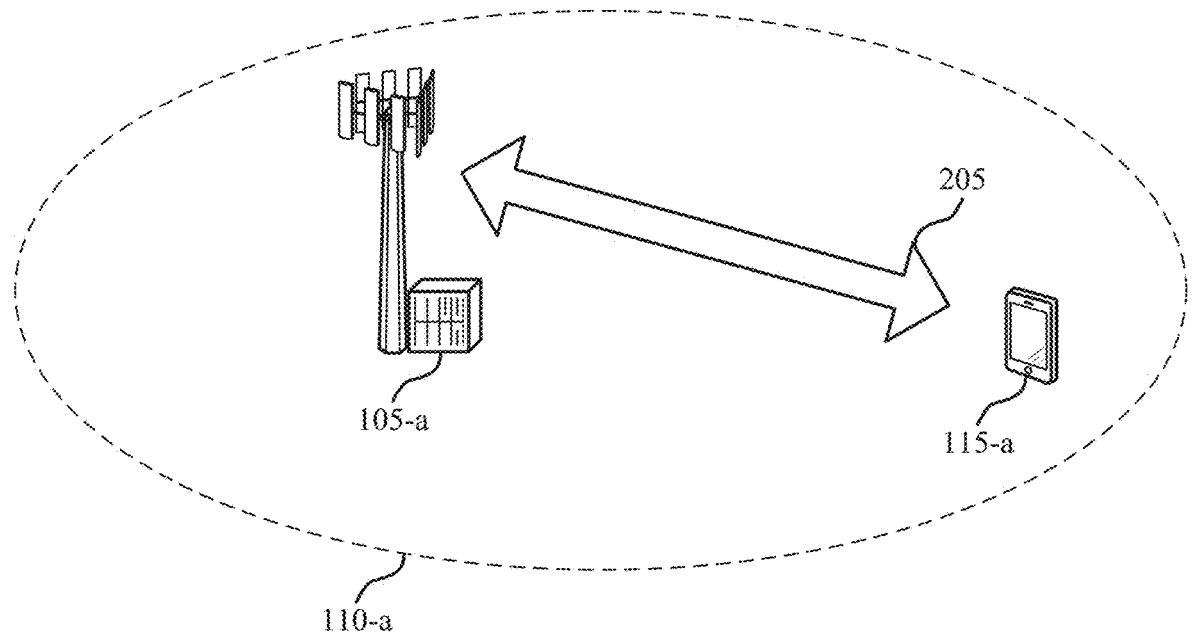
FIG. 2 illustrates an example of a wireless communications system that supports transmission schemes for multiple CCs in adjacent subframes in accordance with aspects of the present disclosure.

FIG. 2 illustrates an example of a wireless communications system 200 that supports transmission schemes for multiple CCs in adjacent subframes in accordance with various aspects of the present disclosure. In some examples, wireless communications system 200 may implement aspects of wireless communications system 100. In some examples, the wireless communications system 200 may include a base station 105-$a$ and UE 115-$a$, which may be examples of the corresponding devices as described with reference to FIG. 1. Base station 105-$a$ may communicate with UE 115-$a$ over bandwidth 205 within coverage area 110-$a$. Further, base station 105-$a$ may transmit a first grant for a first CC to transmit in a first subframe and a second grant for a second CC to transmit in a second subframe. The first subframe may be consecutive to the second subframe.

UE 115-$a$ may have multiple RF frontends. However, in some cases, UE 115-$a$ may have a single RF frontend available for communication via one or more CCs of bandwidth 205. In the example of FIG. 2, UE 115-$a$ may receive a first grant for a first CC (e.g., $CC_0$) to transmit in a subframe n. UE 115-$a$ may then receive another grant for a second CC (e.g., $CC_1$) to transmit in subframe n+1. The second grant may be received at a time later than the first grant. The subframe n+1 may immediately follow subframe n (i.e., subframe n+1 may be adjacent to subframe n).

In an unlicensed spectrum, UEs 115-$a$ may employ LBT procedures to ensure that the channel is clear before transmitting data. For example, in order to transmit in subframe n+1, UE 115-$a$ may perform an LBT procedure in a subframe prior to subframe n+1 (e.g., subframe n). As a result, UE 115-$a$ may sense the channel to detect whether the channel is free for the transmission to take place in subframe n+1. As UE 115-$a$ has one available RF frontend and since the transmission for $CC_1$ takes place in subframe n+1, UE 115-$a$ may perform the LBT before the start of subframe n+1 using the single RF frontend in subframe n.

Prior to performing the LBT procedure for $CC_1$, UE 115-$a$ may null one or more symbols of the uplink transmission in subframe n. For example, the uplink transmission may be an uplink transmission for the first CC (e.g., $CC_0$) in subframe n. In one example, UE 115-$a$ may determine the number of RF frontends available for use during subframe n. If there is an available RF frontend, then UE 115-$a$ may perform the LBT procedure at the available RF frontend. However, if there are no other available RF frontends, then UE 115-$a$ may null one or more symbols in subframe n in order to perform an LBT procedure for an uplink transmission during subframe n+1. For example, UE 115-$a$ may null a predetermined number of symbols towards the end of subframe n such that transmission is not performed during the nulled symbols.

In some examples, UE 115-$a$ may determine a number of symbols to null based at least in part on a first duration and a second duration. Upon receiving the second grant for $CC_1$ to transmit in subframe n+1, UE 115-$a$ may determine a duration to perform an LBT procedure for $CC_1$. In one example, the LBT duration may be shorter than one OFDM symbol. UE 115-$a$ may determine the second duration to switch from a transmission mode to a reception mode. For example, UE 115-$a$ may determine a time duration for switching from an uplink transmission mode to a reception mode for performing the LBT procedure. In some cases, UE 115-$a$ may determine the number of symbols to null based on the first duration and the second duration. In another example, UE 115-$a$ may determine that the LBT duration is shorter than one OFDM symbol and in order to have sufficient time to allow switching from transmission mode to reception mode as well as perform an LBT operation, UE 115-$a$ may null at least one symbol (e.g., the last one or more symbols) within subframe n.

Upon receiving a second grant to transmit using $CC_1$ in subframe n+1, UE 115-$a$ may identify an MCS for the uplink transmission for $CC_0$. UE 115-$a$ may determine the number of symbols to null based on the MCS. In some examples, the loss of one or more OFDM symbols may be compensated by channel coding used for uplink transmission.

Figure 3A:
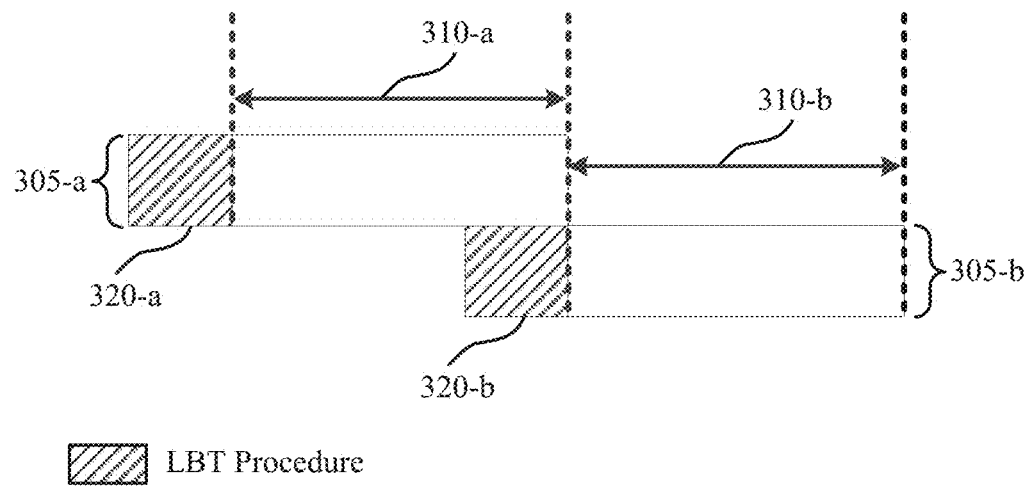
FIGS. 3A and 3B illustrate examples of transmission schemes that support multiple CCs in adjacent subframes in accordance with aspects of the present disclosure.
Figure 3B:
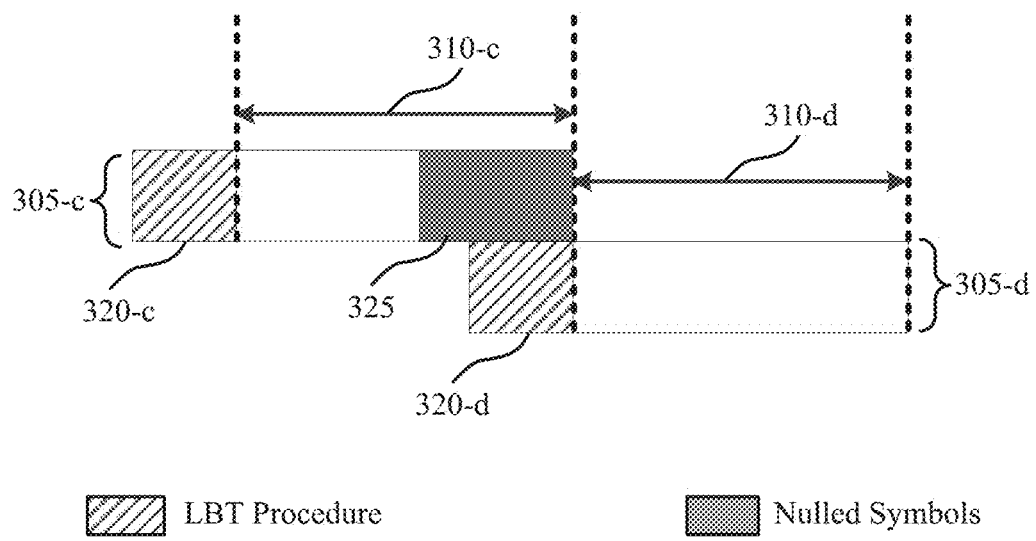

FIGS. 3A and 3B illustrate examples of transmission schemes 300 that support transmission scheme for multiple CCs 305 in adjacent subframes in accordance with various aspects of the present disclosure. In some examples, transmission schemes 300 may implement aspects of wireless communication systems 100 or 200 as described with reference to FIGS. 1 and 2.

As shown, FIG. 3A illustrates an example transmission scheme 300-$a$. In this example, multiple resource grants may be received by a UE, each of which may grant the UE access to perform transmission over a given CC 305. In some examples, each grant may be for a different CC 305 and different subframes. For example, a first grant may grant the UE access to perform transmission in a first subframe 310-$a$ using a first CC 305-$a$. In some examples, the UE may also receive a second grant, which may grant the UE access to perform transmission in a second subframe 310-$b$ using a second CC 305-$b$. In this example, the second subframe 310-$b$ may be adjacent (e.g., consecutive in time) to the first subframe 310-$a$.

In FIG. 3A, multiple grants may be received to transmit in multiple subframes. In this example, a first grant is received for a first uplink transmission to be performed in the first subframe 310-$a$ and a second grant is received for a second uplink transmission in the second subframe 310-$b$. In some cases, the subframes 310-$a$ and 310-$b$ may include the same number of symbols. In one example, each of subframe 310-$a$ and subframe 310-$b$ may include multiple symbols spanning various durations in time.

For transmissions in an unlicensed spectrum, the UE may perform an LBT procedure prior to utilizing a CC 305 for uplink transmissions. For instance, in order to transmit during first subframe 310-$a$, a UE may perform an LBT procedure 320-$a$ prior to the beginning of the first subframe 310-$a$. The LBT procedure 320-$a$ may involve the UE entering a reception mode in order to listen for communications by other devices that may be utilizing CC 305-$a$. Similarly, in order to communicate during second subframe 310-$b$, the UE may perform an LBT procedure 320-$b$ prior to the beginning of the second subframe 310-*b*. For instance, if the UE is scheduled to transmit on CC 305-*b* during the second subframe 310-*b*, the UE may perform the LBT procedure 320-*b* for CC 305-*b* during first subframe 310-*a* or another subframe prior to the second subframe 310-*b*.

In some examples, such as in the example of FIG. 3A, a UE may have multiple RF frontends and may therefore use a first RF to perform LBT procedure 320-*a* prior to the first subframe 310-*a* and use a second RF to perform an uplink transmission during the first subframe 310-*a*. The UE may use the first RF to perform LBT procedure 320-*b* during subframe 310-*a* prior to subframe 310-*b* during which the UE may utilize the second RF to perform an uplink transmission during the second subframe 310-*b*. However, if the UE has a single RF frontend available for use to transmit or receive messages over one or more CCs, the UE may perform an uplink transmission during the first subframe 310-*a* and wait for the RF frontend to be available for performing an LBT procedure. As a result, if the UE has a single RF frontend available for use, the LBT procedure 320-*b* for the second subframe 310-*b* may be unable to be performed during the first subframe 310-*a* as the RF frontend is being used for transmission via the first CC 305-*a*. In such instances, a UE may determine to null one or more symbols of the uplink transmission performed during the first subframe 310-*a* to make time for an LBT procedure.

For example, as shown in FIG. 3B, multiple grants may be received by a UE for transmission over multiple subframes 310. In this example, a first grant is received for a first uplink transmission to be performed in the first subframe 310-*c* and a second grant is received for a second uplink transmission in the second subframe 310-*d*. In some cases, the subframes 310-*c* and 310-*d* may include the same number of symbols and in one example, each of subframe 310-*c* and subframe 310-*d* may include multiple symbols spanning various durations in time.

In order to be able to transmit using a CC 305, the UE may perform an LBT procedure 320 prior to utilizing a CC 305 for uplink transmissions. Therefore, prior to transmitting during the first subframe 310-*c*, the UE performs an LBT procedure 320-*c* for CC 305-*c*. In the example of FIG. 3B, the LBT procedure 320-*c* is performed prior to the beginning of the first subframe 310-*a* (e.g., during a previous subframe). To transmit during a second subframe 310-*d*, the UE may perform an LBT procedure 320-*d* prior to the beginning of the second subframe 310-*d* (e.g., during subframe 310-*c*).

In some instances, the UE may have a single RF frontend available for use to transmit and receive messages. Therefore, prior to performing the LBT procedure 320-*d* for CC 305-*d*, the UE may null one or more symbols 325 of the uplink transmission in subframe 310-*c*. For example, the UE may receive a first grant to transmit during subframe 310-*c* using CC 305-*c* and a second grant to transmit during subframe 310-*d* using CC 305-*d*, which may be different than CC 305-*c*. Upon receiving the second grant, the UE may determine if there are any other RF frontends available to perform LBT procedure 320-*d* during subframe 310-*c*. If there are no other RF frontends available, the UE may determine to null one or more symbols 325 of the uplink transmission performed in subframe 310-*c*. The one or more symbols 325 nulled in subframe 310-*c* may then be used to perform LBT procedure 320-*d*. In some cases, the one or more symbols 325 nulled in subframe 310-*c* may also be used to switch from a transmission mode to a reception mode or from a reception mode to a transmission mode. In some cases, the UE may null a predetermined number of symbols 325 towards the end of the subframe 310-*c*. The UE may determine the number of symbols 325 to null based on a duration for performing LBT procedure 320-*d*. In some cases, the number of symbols 325 nulled may be determined based on a duration to switch from a transmission mode to a reception mode. The UE may also determine the number of symbols 325 to null based on the MCS used for the uplink transmission during subframe 310-*c*.

Figure 4:
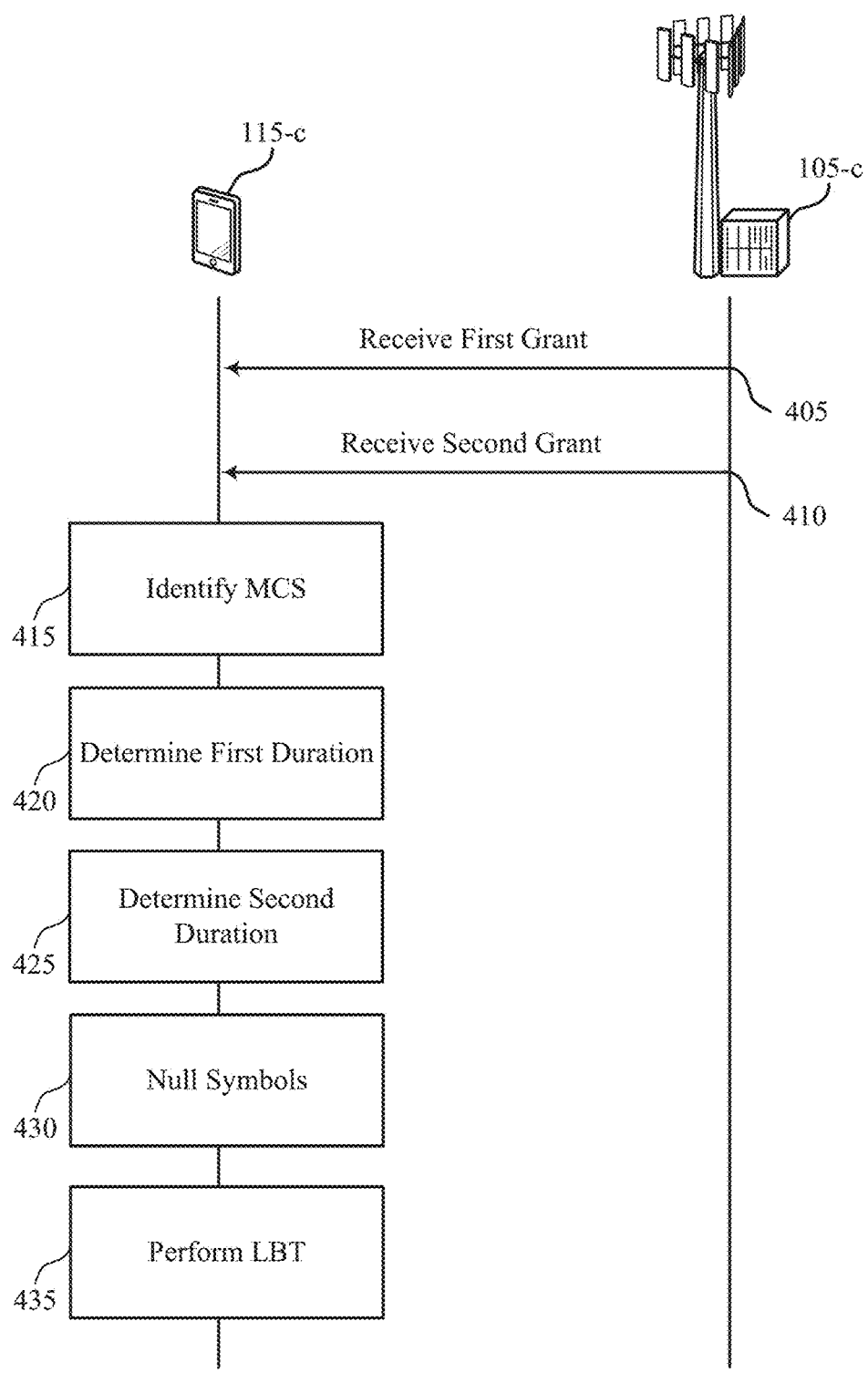
FIG. 4 illustrates an example of a process flow that supports transmission schemes for multiple CCs in adjacent subframes in accordance with aspects of the present disclosure.

FIG. 4 illustrates an example of a process flow 400 that supports transmission schemes for multiple CCs in adjacent subframes in accordance with various aspects of the present disclosure. In some examples, process 400 may implement aspects of wireless communications systems 100 or 200 as described with respect to FIGS. 1 and 2. Process flow 400 may include a base station 105-*c* and a UE 115-*c*, which may represent aspects of techniques performed by a base station 105 or UE 115 as described with reference to FIG. 1 or 2. In some examples, the transmission schemes supported by process flow 400 may represent aspects of techniques described in FIGS. 3A and 3B.

At 405, UE 115-*c* may receive a first grant from base station 105-*c*. The UE 115-*c* may receive the first grant to perform a first uplink transmission using a first CC. For example, the UE 115-*c* may receive the first grant to perform the first uplink transmission during a first subframe.

At 410, UE 115-*c* may receive a second grant. In one example, UE 115-*c* may receive the second grant from base station 105-*c*. The UE 115-*c* may receive the second grant to perform a second uplink transmission using a second CC, which may be different than the first CC. For example, the UE 115-*c* may receive the second grant to perform the second uplink transmission during a second subframe. In some cases, the UE 115-*c* may determine that the second subframe is adjacent to the first subframe and may occur after the completion of the first subframe in time.

At 415, UE 115-*c* may identify an MCS. In some cases, upon receiving the first grant, the UE 115-*c* may identify an MCS for the first uplink transmission. For example, the UE 115-*c* may identify the MCS for first uplink transmission in the first subframe.

At 420, UE 115-*c* may determine a first duration. In the example of FIG. 4, UE 115-*c* may operate in an unlicensed spectrum. As a result, the UE 115-*c* may employ LBT procedures to ensure that the channel is clear before transmitting data. For instance, upon receiving the first grant to transmit during a first subframe at 405, the UE 115-*c* may perform an LBT procedure prior to the beginning of the first subframe. In order to transmit in the second subframe, the UE 115-*c* may perform an LBT procedure during a subframe prior to the second subframe. Upon receiving the second grant at 410, the UE 115-*c* may determine the first duration based on the time for performing an LBT procedure for the second uplink transmission.

At 425, UE 115-*c* may determine a second duration. Upon receiving the first grant, the UE 115-*c* may perform an LBT procedure and may start the uplink transmission during the first subframe. As a result, the UE 115-*c* may remain in a transmission mode. In order for the UE 115-*c* to perform an LBT procedure during the first subframe, the UE may change its operation mode from a transmission mode to a reception mode. In some examples, UE 115-*c* may determine the second duration based on the time to switch from a transmission mode to a reception mode. For example, UE 115-*c* may determine a time duration for the RF frontend to switch from an uplink transmission mode to a reception mode for performing the LBT procedure for the second uplink transmission.

At 430, UE 115-c may one or more null symbols of the uplink transmission performed during the first subframe. In some cases, UE 115-c may determine the number of symbols to null based on the first duration determined at 420 and the second duration determined at 425. In some cases, the UE 115-c may determine the number of symbols based on the MCS identified at 415. In one example, UE 115-c may determine that the LBT duration is shorter than one OFDM symbol and in order to have sufficient time to allow switching from transmission mode to reception mode and LBT operation, UE 115-c may null a symbol of the first subframe.

At 435, UE 115-c may perform an LBT procedure (e.g., for an adjacent subframe). Upon nulling one or more symbols at 430, the UE 115-c may perform the LBT procedure during the time period of the nulled one or more symbols.

Figure 5:
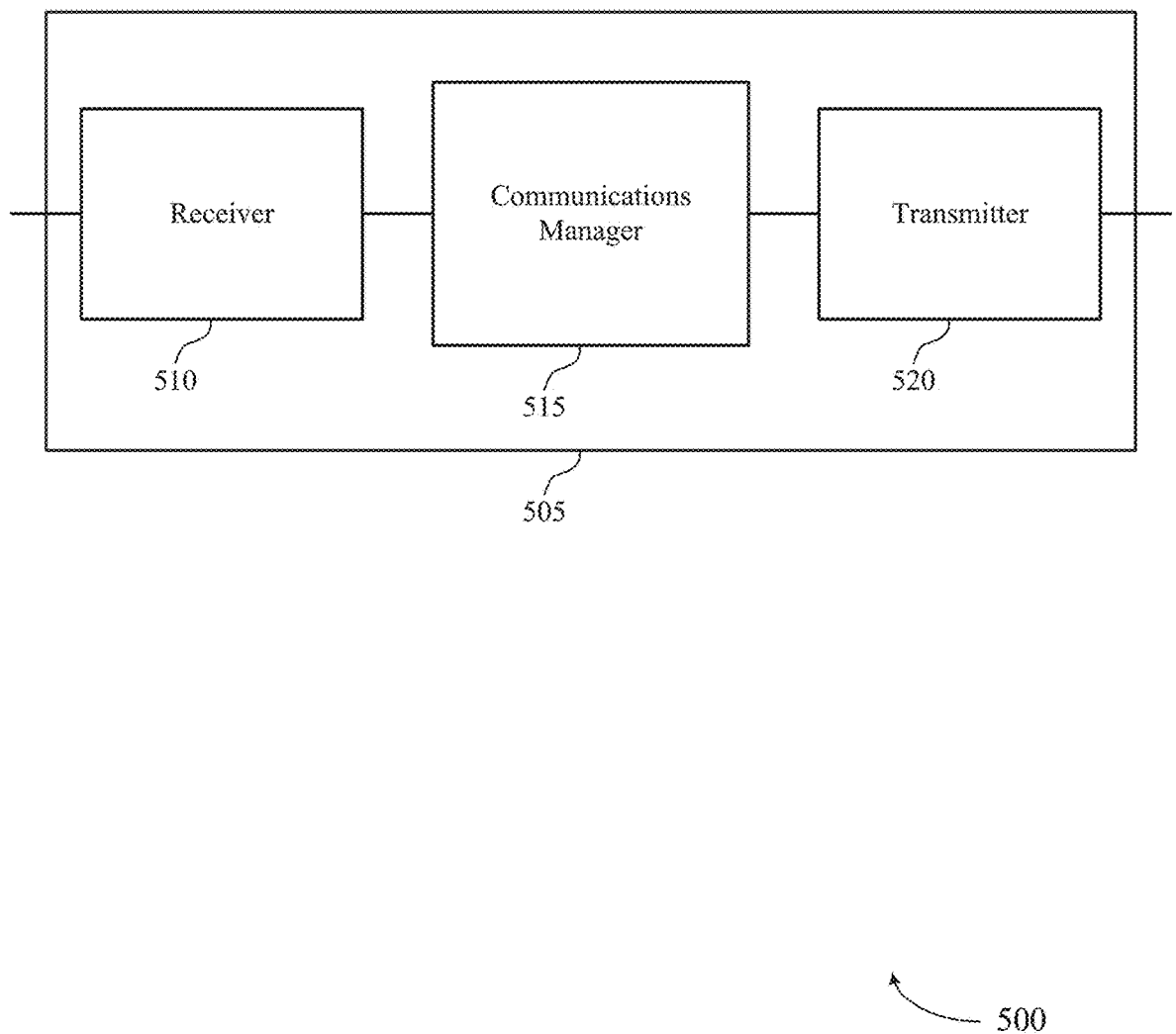
FIGS. 5 through 7 show diagrams of a device that supports transmission schemes for multiple CCs in adjacent subframes in accordance with aspects of the present disclosure.

FIG. 5 shows a diagram 500 of a wireless device 505 that supports transmission schemes for multiple CCs in adjacent subframes in accordance with aspects of the present disclosure. Wireless device 505 may be an example of aspects of a UE 115 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to transmission scheme for multiple CCs in adjacent subframes, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the communications manager 815 described with reference to FIG. 8. Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may receive, at a UE, a first grant to perform a first uplink transmission in a first subframe using a first CC and receive, at the UE, a second grant to perform a second uplink transmission in a second subframe adjacent the first subframe in time. In some examples, communications manager 515 may determine to null one or more symbols of the uplink transmission in the first subframe based on the second grant.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
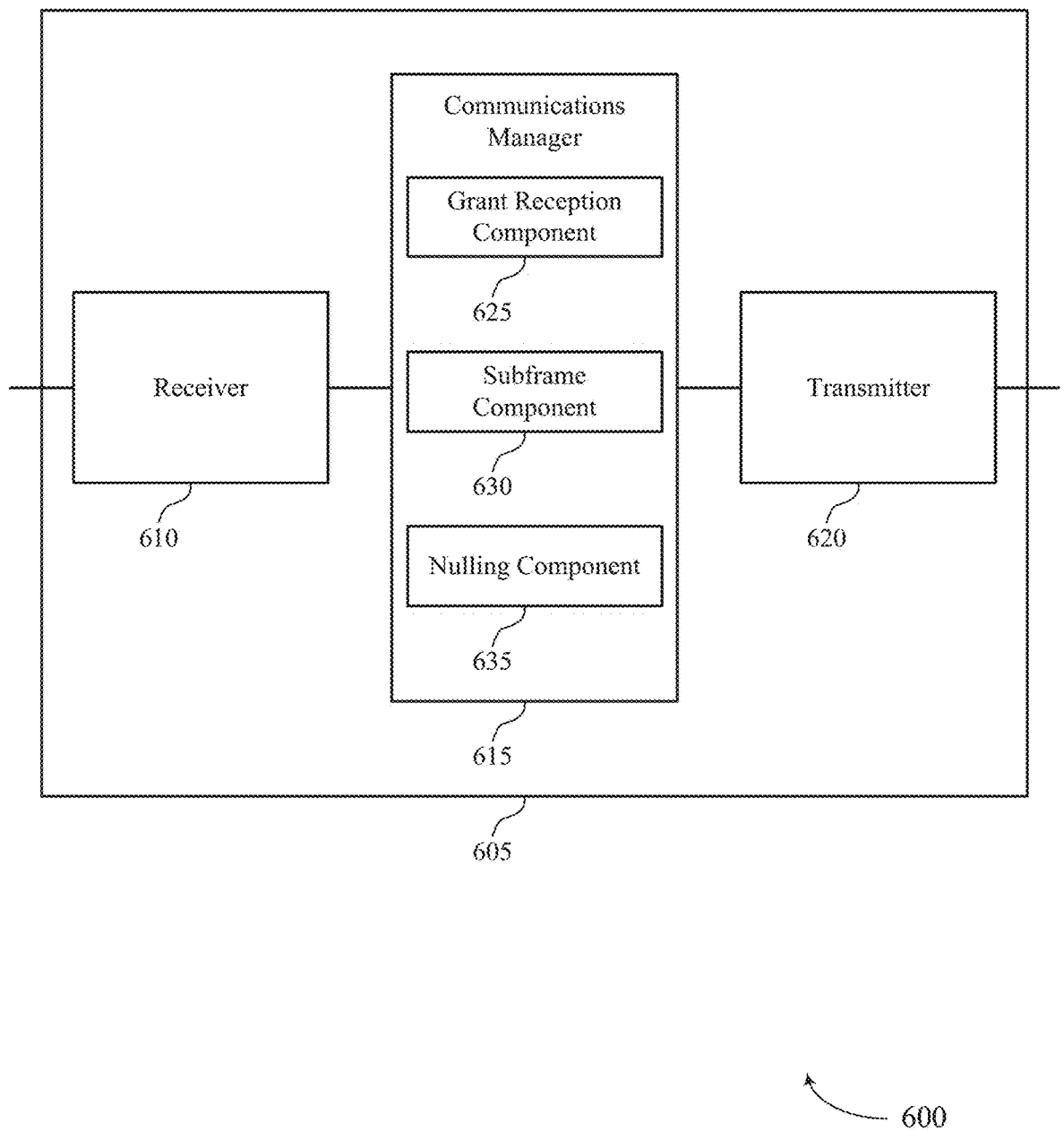

FIG. 6 shows a diagram 600 of a wireless device 605 that supports transmission schemes for multiple CCs in adjacent subframes in accordance with aspects of the present disclosure. Wireless device 605 may be an example of aspects of a wireless device 505 or a UE 115 as described with reference to FIG. 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to transmission scheme for multiple CCs in adjacent subframes, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the communications manager 815 described with reference to FIG. 8. Communications manager 615 may also include grant reception component 625, subframe component 630, and nulling component 635.

Grant reception component 625 may receive, at a UE, a first grant to perform a first uplink transmission in a first subframe using a first CC. In some cases, the first grant is an LAA grant for the first CC.

Subframe component 630 may receive, at the UE, a second grant to perform a second uplink transmission in a second subframe adjacent the first subframe in time. In some cases, the second grant indicates a second CC to be used for the second uplink transmission, the second CC being different from the first CC.

Nulling component 635 may determine to null one or more symbols of the uplink transmission in the first subframe based on the second grant. In some examples, determining to null the one or more symbols of the first uplink transmission is based on an availability of a single RF frontend for use by the UE. In some aspects, nulling component 635 may determine a number of symbols to null based on the MCS of the first uplink transmission.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
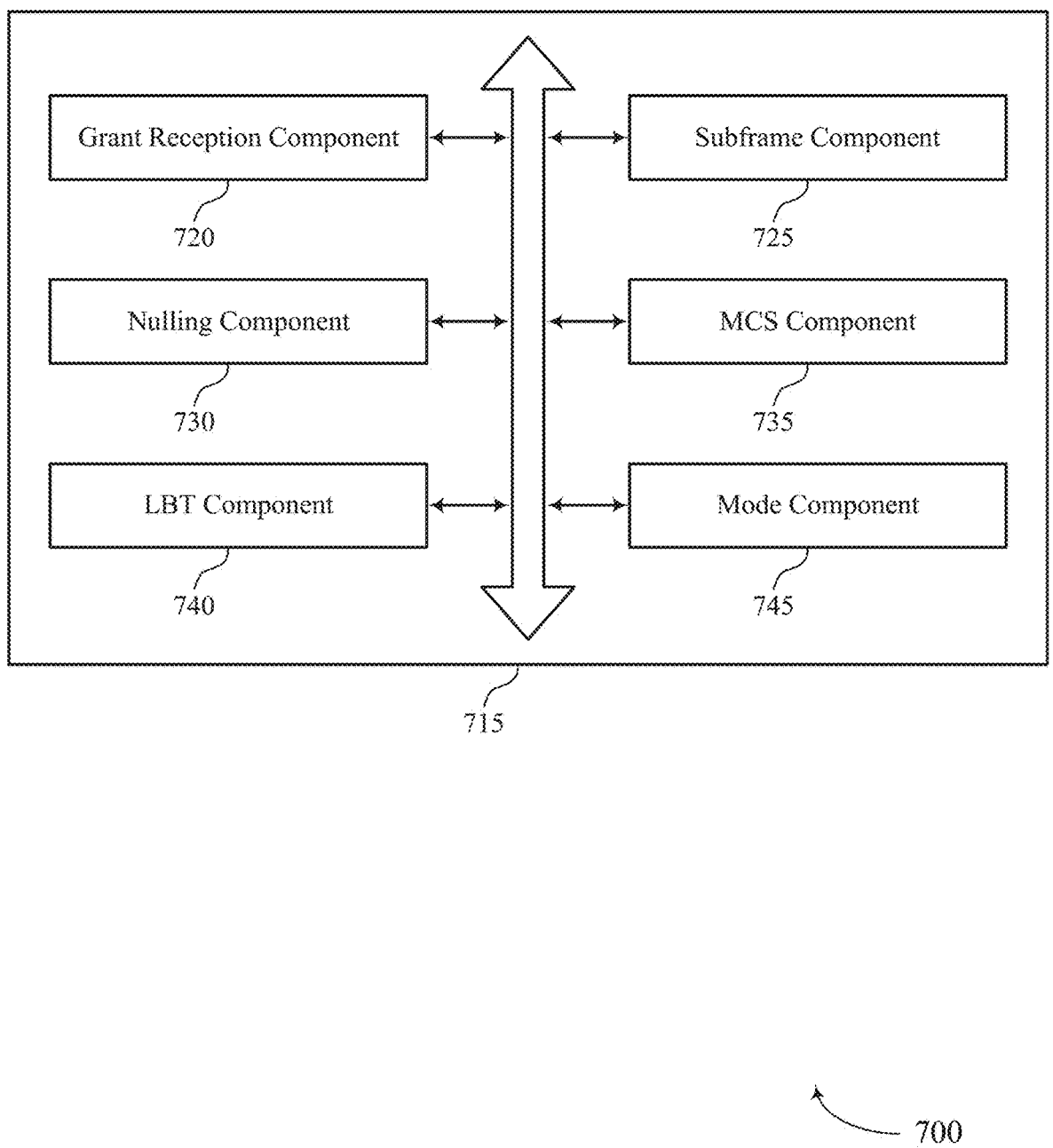

FIG. 7 shows a diagram 700 of a communications manager 715 that supports transmission schemes for multiple CCs in adjacent subframes in accordance with aspects of the present disclosure. The communications manager 715 may be an example of aspects of a communications manager 515, a communications manager 615, or a communications manager 815 described with reference to FIGS. 5, 6, and 8. The communications manager 715 may include grant reception component 720, subframe component 725, nulling component 730, MCS component 735, LBT component 740, and mode component 745. Each of these modules may communicate, directly or indirectly, with one another (e.g., via one or more buses).

Grant reception component 720 may receive, at a UE, a first grant to perform a first uplink transmission in a first subframe using a first CC. In some cases, the first grant is an LAA grant for the first CC.

Subframe component 725 may receive, at the UE, a second grant to perform a second uplink transmission in a second subframe adjacent the first subframe in time. In some cases, the second grant indicates a second CC to be used for the second uplink transmission, the second CC being different from the first CC.

Nulling component 730 may determine to null one or more symbols of the uplink transmission in the first subframe based on the second grant. In some examples, determining to null the one or more symbols of the first uplink transmission is based on an availability of a single RF frontend for use by the UE. In some aspects, nulling component 730 may determine a number of symbols to null based on the MCS of the first uplink transmission.

MCS component 735 may identify an MCS of the first uplink transmission in the first subframe.

LBT component 740 may determine a first duration for an LBT procedure of a second CC during the first subframe and perform, during the first duration and prior to a beginning of the second subframe, the LBT procedure of the second CC.

Mode component 745 may determine a second duration to switch from a first communication mode to a second communication mode during the first subframe. In some cases, the one or more symbols to null are determined based on the first and second durations. In some examples, the first communication mode includes a transmission mode and the second communication mode includes a reception mode.

Figure 8:
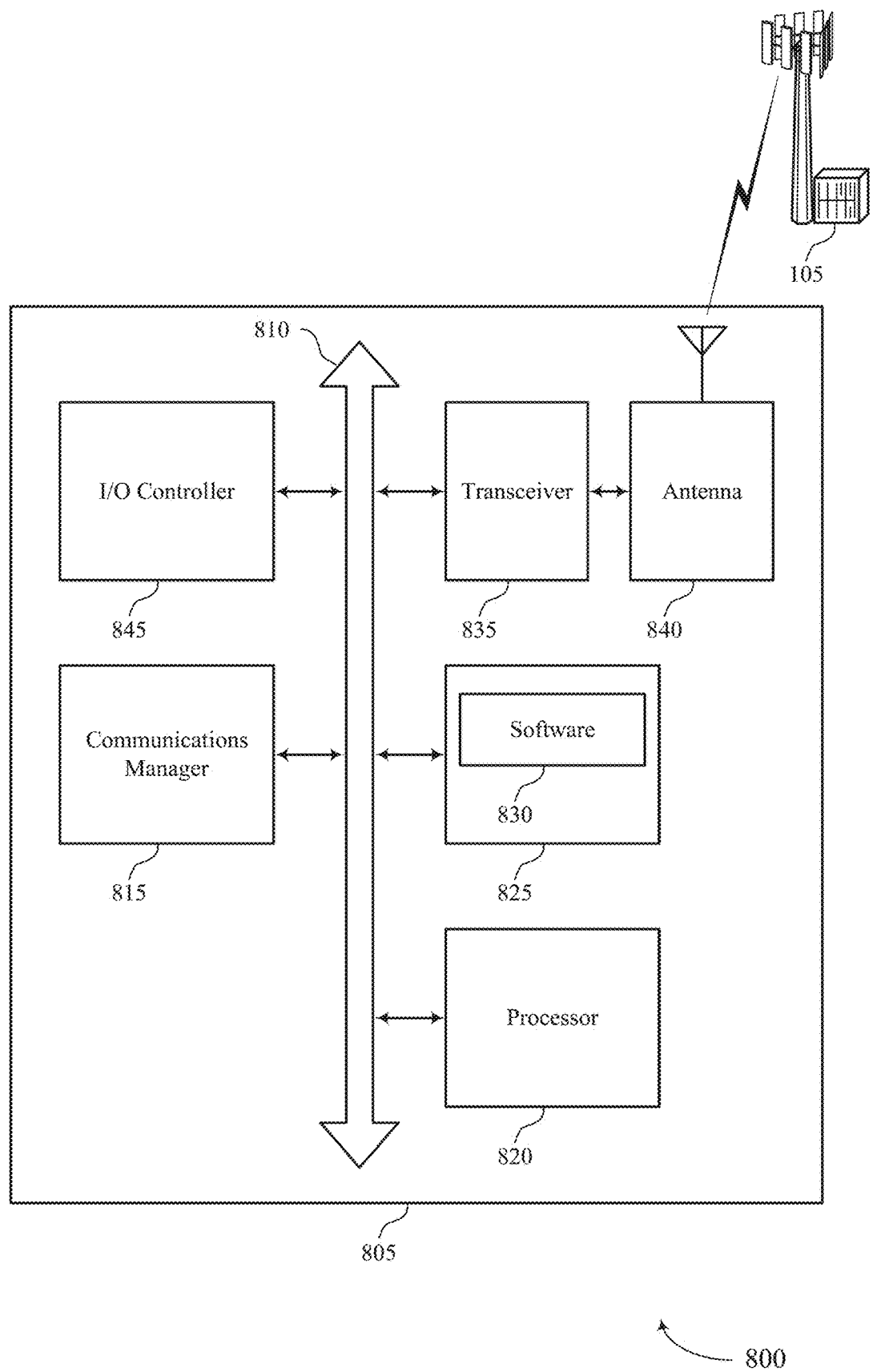
FIG. 8 illustrates a diagram of a system including a UE that supports transmission schemes for multiple CCs in adjacent subframes in accordance with aspects of the present disclosure.

FIG. 8 shows a diagram of a system 800 including a device 805 that supports transmission schemes for multiple CCs in adjacent subframes in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting transmission scheme for multiple CCs in adjacent subframes).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support transmission scheme for multiple CCs in adjacent subframes. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the device 805 may include a single antenna 840. However, in some cases the device 805 may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor, such as processor 820. In some cases, a user may interact with device 805 via I/O controller 845 or via hardware components controlled by I/O controller 845.

Figure 9:
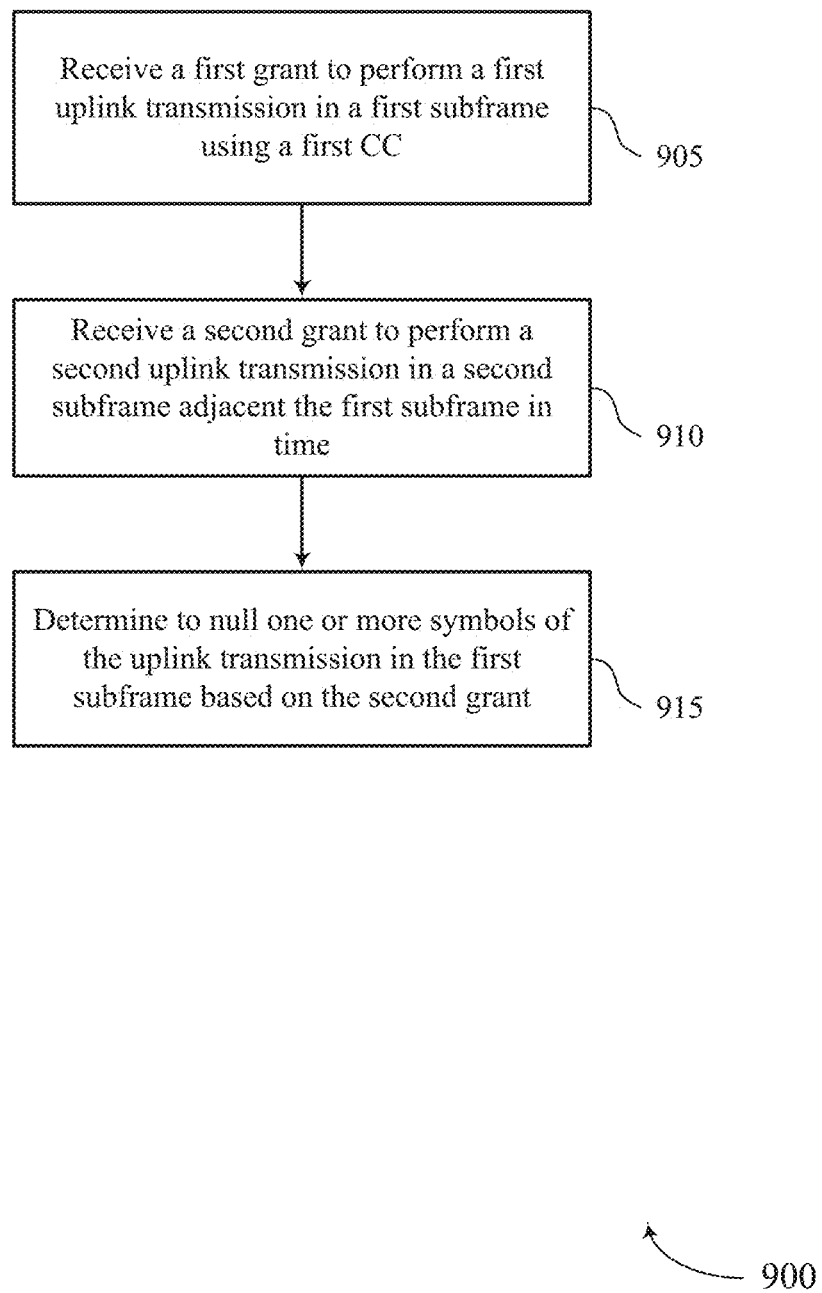
FIGS. 9 through 11 illustrate methods for transmission scheme for multiple CCs in adjacent subframes in accordance with aspects of the present disclosure.

FIG. 9 shows a flowchart illustrating a method 900 for transmission scheme for multiple CCs in adjacent subframes in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may receive a first grant to perform a first uplink transmission in a first subframe using a first CC. The operations of block 905 may be performed according to the methods described herein. In some examples, aspects of the operations of block 905 may be performed by a grant reception component as described with reference to FIGS. 5 through 8.

At block 910 the UE 115 may receive a second grant to perform a second uplink transmission in a second subframe adjacent the first subframe in time. The operations of block 910 may be performed according to the methods described herein. In some examples, aspects of the operations of block 910 may be performed by a subframe component as described with reference to FIGS. 5 through 8.

At block 915 the UE 115 may determine to null one or more symbols of the uplink transmission in the first subframe based at least in part on the second grant. The operations of block 915 may be performed according to the methods described herein. In some examples, aspects of the operations of block 915 may be performed by a nulling component as described with reference to FIGS. 5 through 8.

Figure 10:
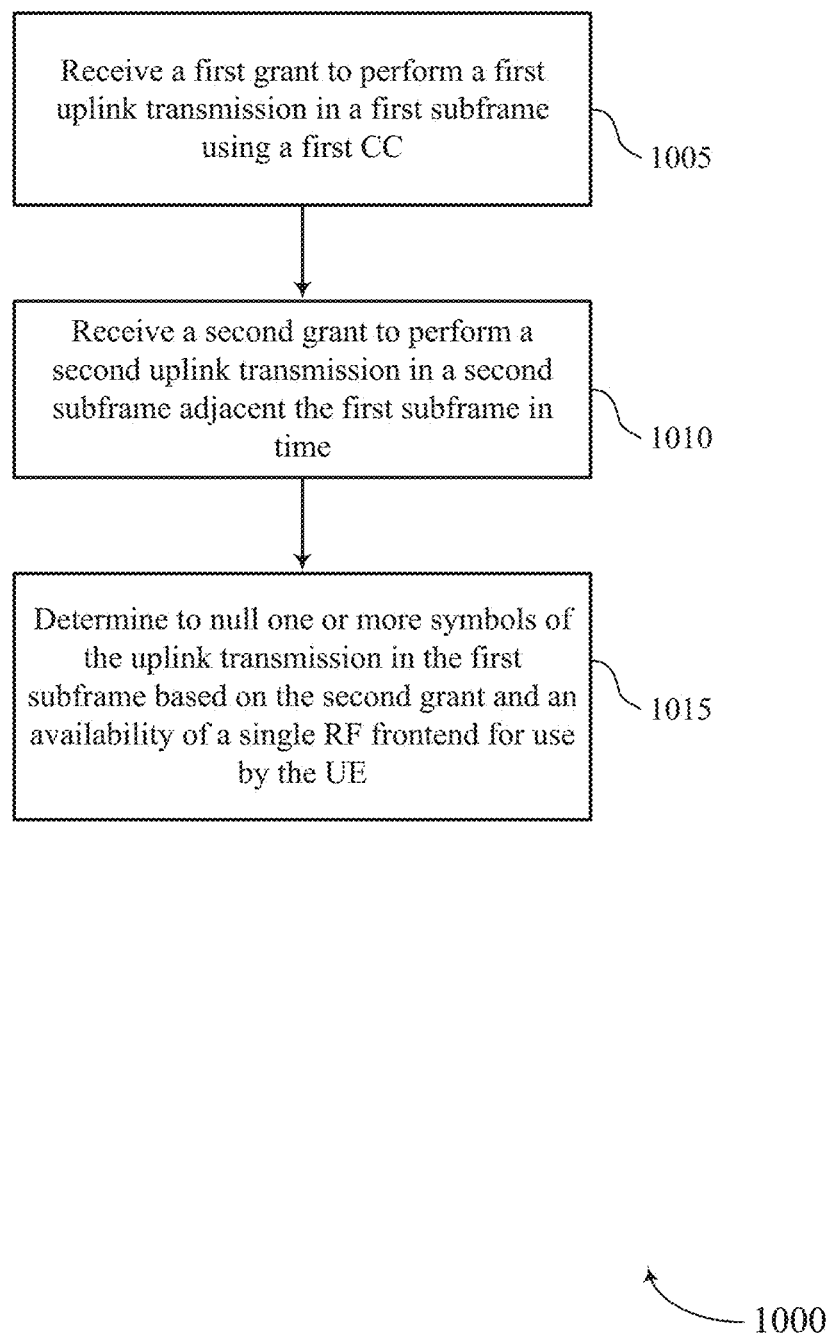

FIG. 10 shows a flowchart illustrating a method 1000 for transmission scheme for multiple CCs in adjacent subframes in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may receive a first grant to perform a first uplink transmission in a first subframe using a first CC. The operations of block 1005 may be performed according to the methods described herein. In some examples, aspects of the operations of block 1005 may be performed by a grant reception component as described with reference to FIGS. 5 through 8.

At block 1010 the UE 115 may receive a second grant to perform a second uplink transmission in a second subframe adjacent the first subframe in time. The operations of block 1010 may be performed according to the methods described herein. In some examples, aspects of the operations of block 1010 may be performed by a subframe component as described with reference to FIGS. 5 through 8.

At block 1015 the UE 115 may determine to null one or more symbols of the uplink transmission in the first subframe based at least in part on the second grant and an availability of a single RF frontend for use by the UE 115. The operations of block 1020 may be performed according to the methods described herein. In some examples, aspects of the operations of block 1020 may be performed by a nulling component as described with reference to FIGS. 5 through 8.

Figure 11:
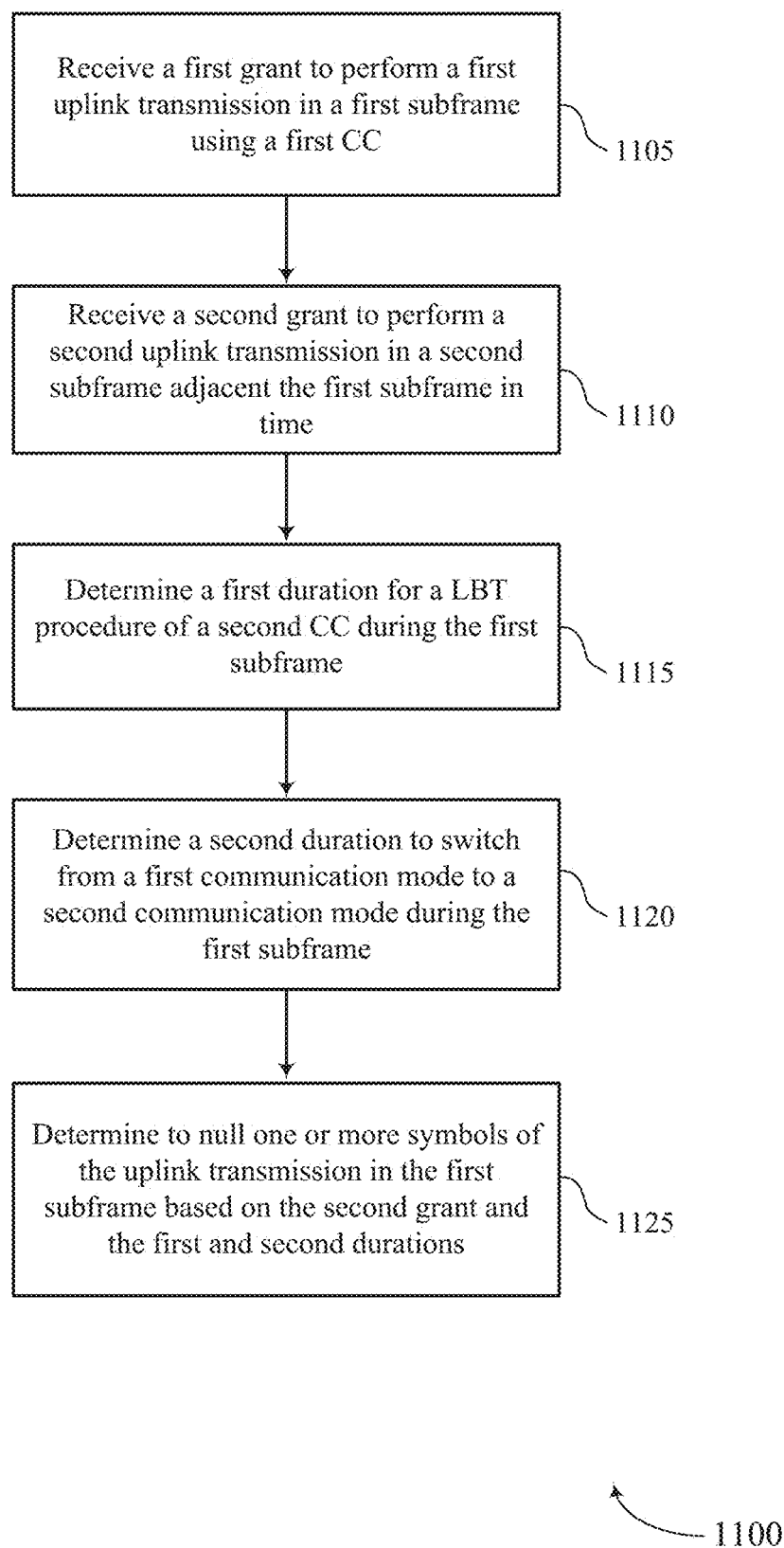

FIG. 11 shows a flowchart illustrating a method 1100 for transmission scheme for multiple CCs in adjacent subframes in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may receive a first grant to perform a first uplink transmission in a first subframe using a first CC. The operations of block 1105 may be performed according to the methods described herein. In some examples, aspects of the operations of block 1105 may be performed by a grant reception component as described with reference to FIGS. 5 through 8.

At block 1110 the UE 115 may receive a second grant to perform a second uplink transmission in a second subframe adjacent the first subframe in time. The operations of block 1110 may be performed according to the methods described herein. In some examples, aspects of the operations of block 1110 may be performed by a subframe component as described with reference to FIGS. 5 through 8.

At block 1115 the UE 115 may determine a first duration for an LBT procedure of a second CC during the first subframe. The operations of block 1115 may be performed according to the methods described herein. In some examples, aspects of the operations of block 1115 may be performed by an LBT component as described with reference to FIGS. 5 through 8.

At block 1120 the UE 115 may determine a second duration to switch from a first communication mode to a second communication mode during the first subframe. The operations of block 1120 may be performed according to the methods described herein. In some examples, aspects of the operations of block 1120 may be performed by a mode component as described with reference to FIGS. 5 through 8.

At block 1125 the UE 115 may determine to null one or more symbols of the uplink transmission in the first subframe based at least in part on the second grant and the first and second durations. The operations of block 1125 may be performed according to the methods described herein. In some examples, aspects of the operations of block 1125 may be performed by a nulling component as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), a first grant to perform a first uplink transmission in a first subframe using a first component carrier;
   receiving, at the UE, a second grant to perform a second uplink transmission in a second subframe subsequent in time to the first subframe using a second component carrier;
   determining, at the UE, that the second subframe is consecutive to the first subframe;
   determining, at the UE, a number of radio frequency (RF) frontends available for use by the UE;
   determining, at the UE, to null one or more symbols of the first uplink transmission in the first subframe based at least in part on the determination by the UE that the second subframe is consecutive to the first subframe and the determination by the UE of the number of RF frontends available for use by the UE; and
   transitioning from a transmission mode using the first component carrier to a reception mode using the second component carrier during the nulled one or more symbols of the first uplink transmission.

2. The method of claim 1, wherein determining to null the one or more symbols of the first uplink transmission is based at least in part on an availability of a single RF frontend for use by the UE.

3. The method of claim 1, wherein:
   the second component carrier is different from the first component carrier.

4. The method of claim 1, further comprising:
   identifying a modulation and coding scheme (MCS) of the first uplink transmission in the first subframe; and
   determining a number of symbols to null based at least in part on the MCS of the first uplink transmission.

5. The method of claim 1, further comprising:
   determining a first duration for a listen-before-talk (LBT) procedure of the second component carrier during the first subframe; and
   determining a second duration to switch from a first communication mode to a second communication mode during the first subframe, wherein the one or more symbols to null are determined based at least in part on the first and second durations.

6. The method of claim 5, further comprising:
   performing, during the first duration and prior to a beginning of the second subframe, the LBT procedure of the second component carrier.

7. The method of claim 1, wherein:
   the first grant is a licensed assisted access (LAA) grant for the first component carrier.

8. An apparatus for wireless communication, comprising:
   means for receiving, at a user equipment (UE), a first grant to perform a first uplink transmission in a first subframe using a first component carrier;
   means for receiving, at the UE, a second grant to perform a second uplink transmission in a second subframe subsequent in time to the first subframe using a second component carrier;
   means for determining, at the UE, that the second subframe is consecutive to the first subframe;
   determining, at the UE, a number of radio frequency (RF) frontends available for use by the UE;
   means for determining, at the UE, to null one or more symbols of the first uplink transmission in the first subframe based at least in part on the determination by the UE that the second subframe is consecutive to the first subframe and the determination by the UE of the number of RF frontends available for use by the UE; and
   transitioning from a transmission mode using the first component carrier to a reception mode using the second component carrier during the nulled one or more symbols of the first uplink transmission.

9. The apparatus of claim 8, wherein the means for determining to null the one or more symbols of the first uplink transmission is based at least in part on an availability of a single RF frontend for use by the UE.

10. The apparatus of claim 8, wherein:
the second component carrier is different from the first component carrier.

11. The apparatus of claim 8, further comprising:
means for identifying a modulation and coding scheme (MCS) of the first uplink transmission in the first subframe; and
means for determining a number of symbols to null based at least in part on the MCS of the first uplink transmission.

12. The apparatus of claim 8, further comprising:
means for determining a first duration for a listen-before-talk (LBT) procedure of the second component carrier during the first subframe; and
means for determining a second duration to switch from a first communication mode to a second communication mode during the first subframe, wherein the one or more symbols to null are determined based at least in part on the first and second durations.

13. The apparatus of claim 12, further comprising:
means for performing, during the first duration and prior to a beginning of the second subframe, the LBT procedure of the second component carrier.

14. The apparatus of claim 8, wherein:
the first grant is a licensed assisted access (LAA) grant for the first component carrier.

15. An apparatus for wireless communication, comprising:
a processor;
memory coupled with the processor; and
instructions stored in the memory and operable, when executed by the processor, to cause the apparatus to:
receive, at a user equipment (UE), a first grant to perform a first uplink transmission in a first subframe using a first component carrier;
receive, at the UE, a second grant to perform a second uplink transmission in a second subframe subsequent in time to the first subframe using a second component carrier;
determine, at the UE, that the second subframe is consecutive to the first subframe;
determine, at the UE, a number of radio frequency (RF) frontends available for use by the UE;
determine, at the UE, to null one or more symbols of the first uplink transmission in the first subframe based at least in part on the determination by the UE that the second subframe is consecutive to the first subframe and the determination by the UE of the number of RF frontends available for use by the UE; and
transition from a transmission mode using the first component carrier to a reception mode using the second component carrier during the nulled one or more symbols of the first uplink transmission.

16. The apparatus of claim 15, wherein:
determining to null the one or more symbols of the first uplink transmission is based at least in part on an availability of a single RF frontend for use by the UE.

17. The apparatus of claim 15, wherein:
the second component carrier is different from the first component carrier.

18. The apparatus of claim 15, wherein the instructions are further executable by the processor to:
identify a modulation and coding scheme (MCS) of the first uplink transmission in the first subframe; and
determine a number of symbols to null based at least in part on the MCS of the first uplink transmission.

19. The apparatus of claim 15, wherein the instructions are further executable by the processor to:
determine a first duration for a listen-before-talk (LBT) procedure of the second component carrier during the first subframe; and
determine a second duration to switch from a first communication mode to a second communication mode during the first subframe, wherein the one or more symbols to null are determined based at least in part on the first and second durations.

20. The apparatus of claim 19, wherein the instructions are further executable by the processor to:
perform, during the first duration and prior to a beginning of the second subframe, the LBT procedure of the second component carrier.

21. The apparatus of claim 15, wherein:
the first grant is a licensed assisted access (LAA) grant for the first component carrier.

22. A non-transitory computer-readable medium storing code for wireless communication, the code comprising instructions executable by a processor to:
receive, at a user equipment (UE), a first grant to perform a first uplink transmission in a first subframe using a first component carrier;
receive, at the UE, a second grant to perform a second uplink transmission in a second subframe subsequent in time to the first subframe using a second component carrier;
determine, at the UE, that the second subframe is consecutive to the first subframe;
determine, at the UE, a number of radio frequency (RF) frontends available for use by the UE;
determine, at the UE, to null one or more symbols of the first uplink transmission in the first subframe based at least in part on the determination by the UE that the second subframe is consecutive to the first subframe and the determination by the UE of the number of RF frontends available for use by the UE; and
transition from a transmission mode using the first component carrier to a reception mode using the second component carrier during the nulled one or more symbols of the first uplink transmission.

23. The non-transitory computer-readable medium of claim 22, wherein:
determining to null the one or more symbols of the first uplink transmission is based at least in part on an availability of a single RF frontend for use by the UE.

24. The non-transitory computer-readable medium of claim 22, wherein:
the second component carrier is different from the first component carrier.

25. The non-transitory computer-readable medium of claim 22, wherein the instructions are further executable by the processor to:
identify a modulation and coding scheme (MCS) of the first uplink transmission in the first subframe; and
determine a number of symbols to null based at least in part on the MCS of the first uplink transmission.

26. The non-transitory computer-readable medium of claim 22, wherein the instructions are further executable by the processor to:
determine a first duration for a listen-before-talk (LBT) procedure of the second component carrier during the first subframe; and
determine a second duration to switch from a first communication mode to a second communication mode during the first subframe, wherein the one or more symbols to null are determined based at least in part on the first and second durations.

27. The non-transitory computer-readable medium of claim 26, wherein the instructions are further executable by the processor to:

perform, during the first duration and prior to a beginning of the second subframe, the LBT procedure of the second component carrier.

* * * * *